(12) United States Patent
Leone

(10) Patent No.: US 6,901,153 B1
(45) Date of Patent: May 31, 2005

(54) HYBRID SOFTWARE/HARDWARE VIDEO DECODER FOR PERSONAL COMPUTER

(75) Inventor: Pasquale Leone, Upper Toronto (CA)

(73) Assignee: ATI Technologies Inc., Ontario (CA)

( * ) Notice: Subject to any disclaimer, the term of this patent is extended or adjusted under 35 U.S.C. 154(b) by 0 days.

(21) Appl. No.: 08/615,836

(22) Filed: Mar. 14, 1996

(51) Int. Cl.[7] ................................................ G06K 9/00
(52) U.S. Cl. ...................... 382/107; 382/232; 348/699
(58) Field of Search .......................... 382/107, 232, 382/251, 236, 100, 155, 154, 153, 233–235, 238, 239, 245–249; 348/699, 700, 722, 701, 725; 345/473, 474, 419, 601; 358/426.13, 426.14; 364/514 A, 514 R; 352/50, 87

(56) References Cited

U.S. PATENT DOCUMENTS

| | | | | |
|---|---|---|---|---|
| 5,448,310 A | * | 9/1995 | Kopet et al. | 348/699 |
| 5,506,954 A | * | 4/1996 | Arshi et al. | 395/162 |
| 5,510,857 A | * | 4/1996 | Kopet et al. | 348/699 |
| 5,515,296 A | * | 5/1996 | Agarwal | 364/514 R |
| 5,530,661 A | * | 6/1996 | Garbe et al. | 708/420 |
| 5,585,852 A | * | 12/1996 | Agarwal | 375/240.11 |
| 5,633,731 A | * | 5/1997 | Maemura | 358/468 |
| 5,634,065 A | * | 5/1997 | Guttag et al. | 364/716 |
| 5,638,128 A | * | 6/1997 | Hoogenboom et al. | 348/416 |
| 5,699,460 A | * | 12/1997 | Kopet et al. | 382/307 |
| 5,740,345 A | * | 4/1998 | Danielson et al. | 345/593 |

* cited by examiner

*Primary Examiner*—Yon J. Couso
(74) *Attorney, Agent, or Firm*—Vedder, Price, Kaufman & Kammholz, P.C.

(57) ABSTRACT

A software/hardware hybrid video decoder, particularly suited for decoding MPEG video, that takes advantage of processing capabilities of graphics coprocessors to perform the motion compensation portion of video decoding. Motion compensation is performed by bit block transfer (bit BLT) operations on the graphics coprocessor. The bit BLT operations perform the addition of pixels in the reference and error blocks. Bit BLT operations may also be used for interpolation between reference blocks to provide subpixel resolution for motion vectors.

17 Claims, 4 Drawing Sheets

HYBRID SOFTWARE/HARDWARE VIDEO DECODER FOR PERSONAL COMPUTER

BACKGROUND OF THE INVENTION

This invention relates to video decoding on personal computers.

MPEG video has become widely accepted as a standard for video. The original protocol, MPEG1, is in widespread use, and a new, higher-quality standard, MPEG2, is being introduced. Typically, MPEG1 decoding performed on personal computers is done using software, as software decoding is much less expensive than hardware decoding, which requires a dedicated video decoder board. Today's high-speed processors (e.g., a 90+ MHz Pentiums) make such software decoders possible. But at 30 frames per second, such decoders are forced to resort to approximating some of the MPEG1 decoding steps (e.g., dequantizing, IDCT, motion compensation), as they cannot otherwise decode quickly enough to keep up with the incoming video. The result is noticeably degraded video quality.

Limited reliance has been placed on the graphics coprocessor chip (sometimes referred to as a graphics accelerator chip) in MPEG video decoding. The graphics coprocessor's role has been to convert the decoded video from YUV to RGB format and to scale the images to a desired size.

MPEG2 decoding will require about 4 times the computing resources required for MPEG1, making it likely that software decoding (with RGB transformation and scaling done by the accelerator chip) will not be feasible. This suggests that it will be necessary to use hardware decoders, e.g., dedicated video boards or chips, to handle MPEG2 decoding.

SUMMARY OF THE INVENTION

The invention provides a software/hardware hybrid decoder that takes advantage of processing capabilities of graphics coprocessors to perform the motion compensation portion of video decoding. The invention should make it possible to decode MPEG1 with full accuracy on today's PCs (e.g., 90–150 MHz Pentiums) and MPEG2 on the next generation PCs (e.g., Pentium MMX or Pentium Pro MMX), without the added cost of a dedicated hardware video decoder. Preferably, motion compensation is performed by bit block transfer, or bit BLT, operations on the graphics coprocessor. The bit BLT operations may be used to add pixels in the reference and error blocks, and to interpolate between reference blocks to provide subpixel resolution for motion vectors.

We have found that about 40% of computational resources required for MPEG decoding are consumed in motion compensation. By moving that 40% of the computations to the graphics coprocessor, where the computations can be performed with bit BLT operations that require little increase in chip complexity, the invention achieves greatly increased video decoding capability at relatively little increase in PC cost.

In general, the invention features decoding a series of frames of motion-compensated video data using a personal computer that includes a central processor and a graphics coprocessor, wherein the software executing on the central processor extracts motion vectors from the video data and decompresses the video data, and the graphics coprocessor carries out the motion compensation.

In preferred embodiments, the software may also transfer frames of video data to the graphics coprocessor, which uses the motion vectors to retrieve motion compensation reference blocks from the frames of video data. The decompression performed by the software may include Huffman decoding and RLE decoding. The software may perform the inverse DCT transform of the video data.

Other features of the invention will be apparent from the following description of preferred embodiments, and from the claims.

DESCRIPTION OF THE PREFERRED EMBODIMENTS

Figure 1:
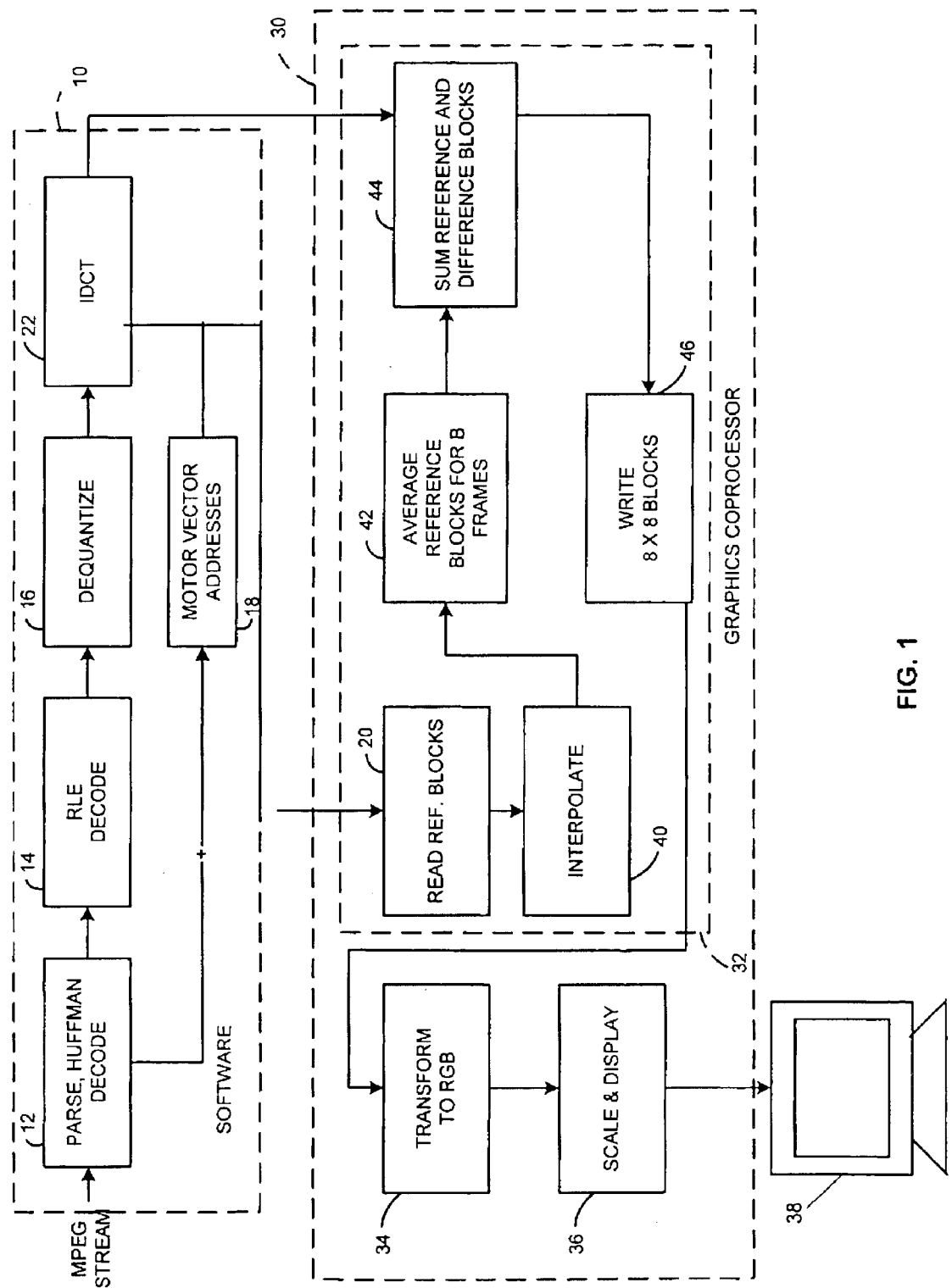
FIG. 1 is a block diagram of the video decoding process of a preferred embodiment of the invention.

The decoding process of the preferred embodiment is shown in FIG. 1. The incoming compressed MPEG video stream is processed by software 10 running on the PC's main processor (e.g., a 150 MHz Pentium for MPEG1). The video packets are parsed, Huffman decoded (12), run length (RLE) decoded (14), and dequantized (16), to produce decompressed macro blocks (dequantizing also includes "de-zigzagging", to remove the diagonal pixel ordering used by MPEG to improve RLE compression). The decompressed blocks are then inverse transformed (IDCT 22), which transforms the spatial frequency coefficients to pixels, and stored in the graphics memory associated with the graphics coprocessor.

Figure 2:
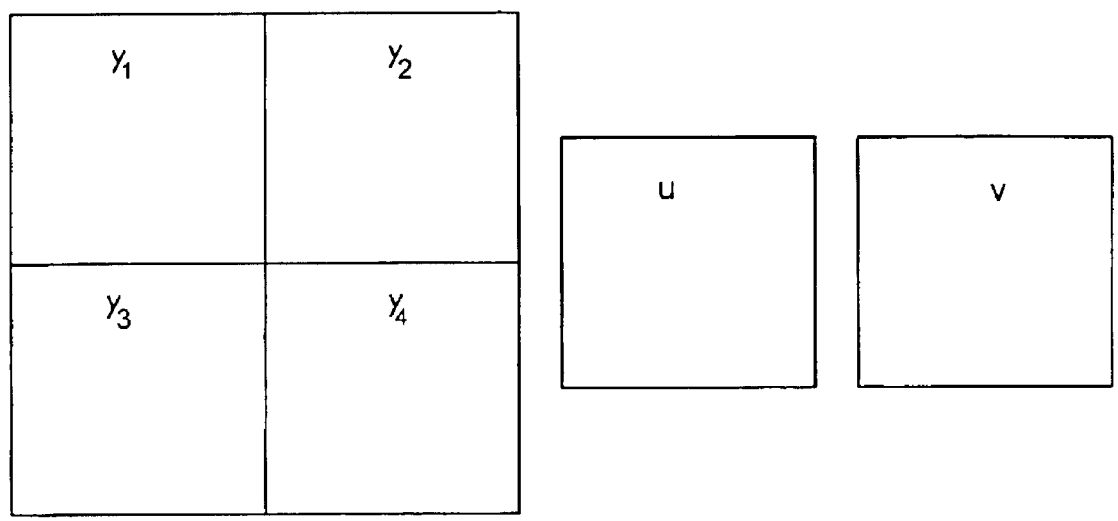
FIG. 2 is a diagram showing the 8×8 pixel blocks making up each macro block of an MPEG encoded image.

Each macro block (FIG. 2) consists of four luminance blocks Y1, Y2, Y3, Y4, and two chrominance blocks U, V. Each block is an 8×8 array of DCT (discrete cosine transform) coefficients representing (in frequency domain form) either the luminance/chrominance at that location in the current frame (intra (I) frames) or the difference (or error) between the luminance/chrominance at that location in the current frame and a reference location in a reference frame(s). There are two types of difference frames: Predicted (P) frames, in which the coefficients represent differences between blocks in the current frame and reference blocks in a prior frame; bidirectional (B) frames, in which the coefficients represent differences between blocks in the current frame and reference blocks in either a future frame, a prior frame, or both a future and a prior frame. For both P and B frames, there are associated motion vectors that identify the reference blocks in the prior and future frames (frames are sent out of order, so that "future" reference frames arrive before the B frames that reference them). The motion vectors are processed (18) to compute the addresses of the reference blocks, and the addresses are supplied to the graphics coprocessor.

The graphics coprocessor 30 uses the reference blocks (which it reads from the reference frames using the supplied block addresses) to motion compensate (32) the decompressed, inverse transformed blocks (for P and B frames). The coprocessor also performs the linear transformation necessary to convert the YUV blocks to RGB form (34), scales the resulting frames as prescribed by the user (36), and provides an output for the PC's display monitor 38.

Figure 3:
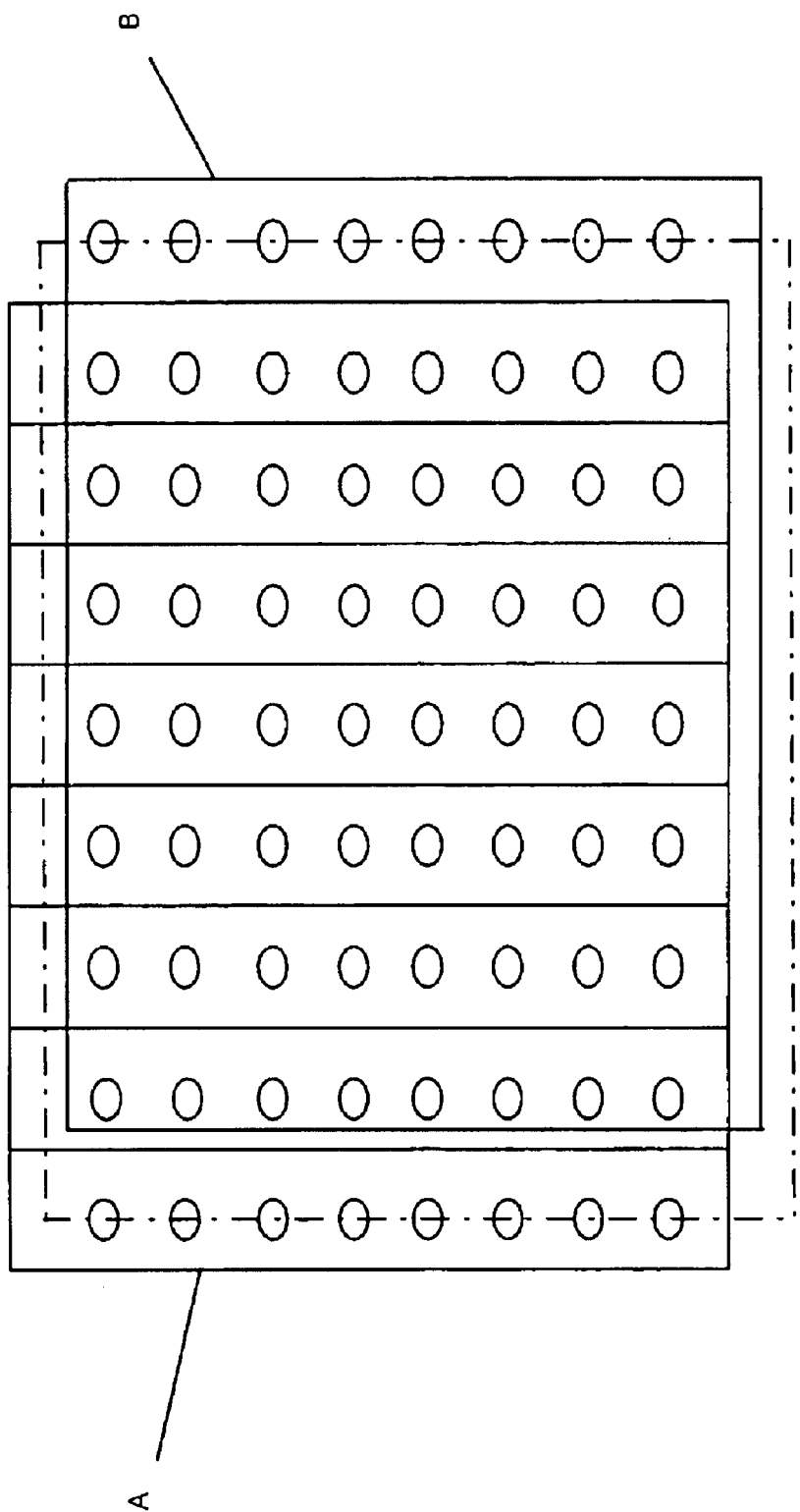
FIG. 3 is a diagram illustrating a half-pixel interpolation in the X direction in computing a reference block for motion compensation.

To increase the accuracy of motion estimation, MPEG motion vectors have a one-half pixel resolution, which is implemented by using as the reference block an interpolated block assumed to lie one-half pixel in either, or both, the X or Y directions from an actual block. Performing that interpolation requires that either an 8×9, 9×8, or 9×9 block be processed to produce the interpolated reference block. Each pixel in the interpolated block is the average of either two or four pixels. The interpolation is performed (40) using a series of bit block transfer (bit BLT) operations in which pixels from one 8×8 block are added to pixels of the 8×8 block one pixel over, and the sums are divided by two. Alternatively, if available in the graphics coprocessor, the interpolation can be performed using a scaling bit BLT, by supplying the scaling bit BLT with either the 9×8, 8×9, or 9×9 input block, and requesting an 8×8 output block. FIG. 3 illustrates the operation for the simple case in which the reference block R is the average of two 8×8 blocks A, B, offset from one another by one pixel in the X direction.

In the case of B frames, the reference blocks from the prior and future frame are averaged (42), using the same bit BLT operation (add and divide by two) used for interpolation.

These interpolation and averaging operations provide the reference blocks that are added (44) to the error blocks produced by the inverse transform operation (IDCT). This addition is also performed using a bit BLT operation. This particular bit BLT operation is not one conventionally found in graphics coprocessor chips, but it could be added at little increase in chip complexity. Pixels of the source block are added to pixels of the destination block and the resulting sums (after appropriate clipping) are written over the corresponding pixels of the destination block. The pixels representing the error terms are signed numbers, whereas the pixels representing the reference block are unsigned numbers. The bit BLT operation must, therefore, add a signed number to an unsigned number, and provide appropriate clipping of the result (e.g., clipping if it exceeds an acceptable range, which could be the full 0 to 255 range provided by 8 bits, or a smaller range such as 16 to 240, to allow values outside those limits to be used for other purposes).

Figure 4:
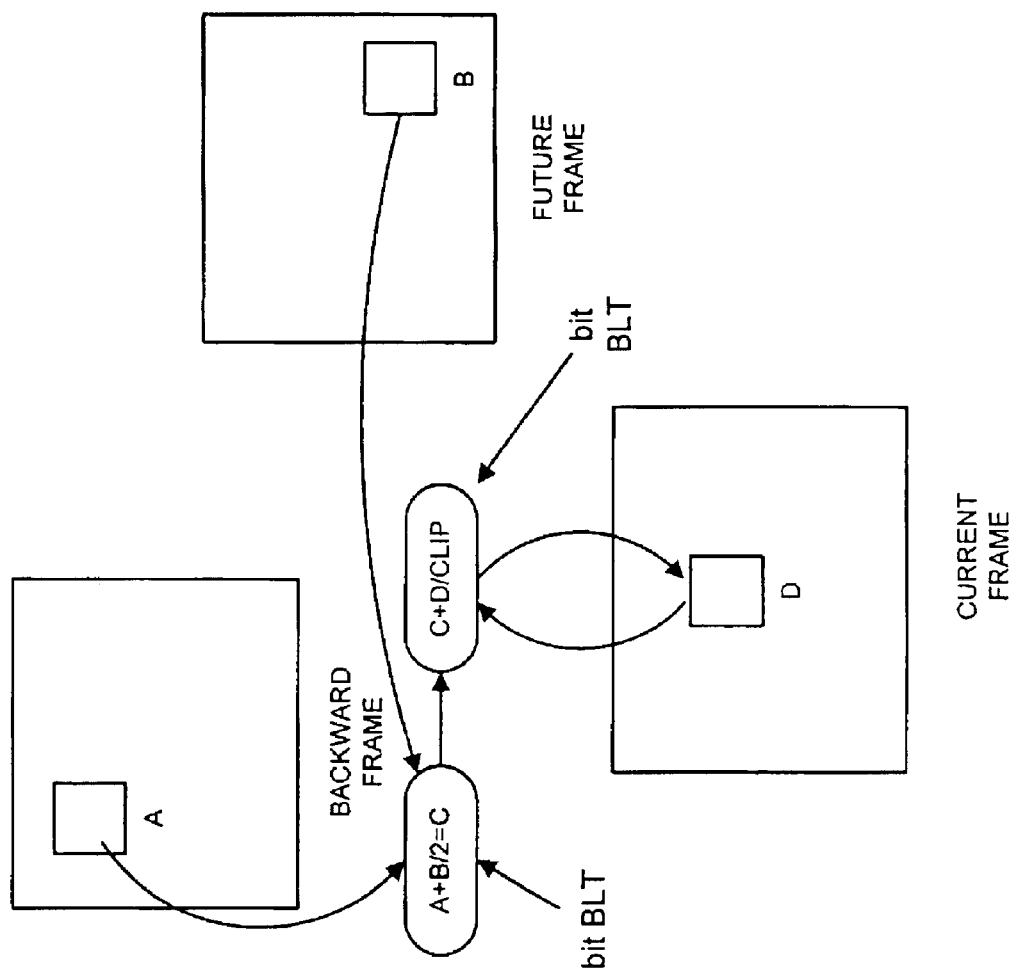
FIG. 4 is a diagram illustrating the processing required to average a backward and forward reference block and to add an error block to a reference block.

FIG. 4 shows the bit BLT operations required to handle the two reference blocks used in motion compensating a B frame block. The add-and-divide-by-two operation could be implemented in at least two ways. The graphics coprocessor could be designed to read both blocks and perform the half-pixel interpolation operation simultaneously. Alternatively, it could read one reference block, write it to a temporary location, and then read the second reference block, add it to the first block and divide by two, and write the result to the temporary location.

FIG. 4 also shows the bit BLT operations required to add the reference block (the averaged blocks in the case of B frames) to the error block. The reference data is the source block, and the error block the destination block. The addition of the source and destination blocks must be a straight add (no division by two), and since there is no divide by two, and since one value is signed (those from the error block), the result must be clipped as noted elsewhere.

Preferably the bit BLT operations are performed in one or a small number of batch operations, in which a list of the bit BLT operations are executed. Such batch processing can perform the bit BLT operations more efficiently than is possible if isolated bit BLT operations are performed. Batch processing is made possible by providing sufficient memory in which to store the lists of bit BLT operations needing execution.

Other embodiments are within the following claims. For example, although it could require an appreciable increase in chip complexity (because of multiplication steps required), and thus not achieve as dramatic gains in price/performance as the preferred embodiment, the IDCT operation could also be moved to the graphics coprocessor. Such a configuration could be quite practical, and of significant value, if the graphics coprocessor provided with the personal computer had built-in fast multiply capability, such as may be the case in three-dimensional graphics coprocessors.

The block size referred to throughout the discussion of the preferred embodiment is 8×8, but other sizes could be used (e.g., a macro block, 16×16, could be processed at once). For frames in which many adjoining blocks receive the same motion compensation, a large number of blocks (even approach an entire frame in size) could efficiently be processed in a single bit BLT operation.

If the invention is applied to MPEG2, it would probably be preferable to use the next generation processor (e.g., Pentium MMX or Pentium Pro MMX).

What is claimed is:

1. A method of decoding a series of frames of motion-compensated video data using a personal computer that includes a central processor and a graphics coprocessor, the method comprising the steps of:

executing a stored program on the central processor to carry out at least the following steps: extracting motion vectors from the video data, and decompressing the video data, and operating the graphics coprocessor to carry out at least the following step: motion compensating the video data based on the motion vectors using bit BLT operations.

2. The method of claim 1 wherein the bit BLT operations comprise adding the pixels of a source block to the pixels of a destination block to create sum pixels, and replacing the pixels of the destination block with the sum pixels.

3. The method of claim 2 wherein one of the source and destination pixels is an unsigned number and the other is a signed number.

4. The method of claim 3 wherein the bit BLT operations comprise adding the pixels of a source block to the pixels of a destination block to create sum pixels, dividing the sum pixels by a constant to create interpolated pixels, and replacing the pixels of the destination block with the interpolated pixels.

5. The method of claim 1 wherein the step of decompressing the video data by the central processor includes decompressing the video data using RLE decoding.

6. A method of decoding a series of frames of motion-compensated video data using a personal computer that includes a central processor and a graphics coprocessor, the method comprising the steps of:

executing a stored program by the central processor to carry out at least the following steps: extracting motion vectors from the video data, and decompressing the video data, operating the graphics coprocessor to carry out at least the following step: motion compensating the video data using bit BLT operations, including interpolating to determine an interpolated reference block, and wherein the interpolating is performed using bit BLT operations.

7. A method of decoding a series of frames of motion-compensated video data using a personal computer that includes a central processor and a graphics coprocessor, the method comprising the steps of:

executing a stored program on the central processor to carry out at least the following steps:

extracting motion vectors from the video data, and decompressing the video data, and operating the graphics coprocessor to carry out at least the following steps:

motion compensating the video data based on motion vectors extracted by the central processor through executing the stored program; and using the motion vectors to retrieve motion compensation reference blocks from frames of video data.

8. The method of claim 7 wherein the step performed by the central processor of partially decompressing the video data comprises Huffman decoding.

9. The method of claim 8 wherein the step performed by the central processor of partially decompressing the video data further comprises RLE decoding.

10. The method of claim 9 wherein the steps performed by the stored program executed on the central processor further comprise forming the inverse transform of the video data to transform the data from spatial frequency coefficients to pixels.

11. The method of claim 7 wherein the steps performed by operating the graphics coprocessor further comprise interpolating to determine an interpolated reference block, and wherein the interpolating is performed using bit BLT operations.

12. The method of claim 8 wherein the bit BLT operations comprise adding the pixels of a source block to the pixels of a destination block to create sum pixels, dividing the sum pixels by a constant to create interpolated pixels, and replacing the pixels of the destination block with the interpolated pixels.

13. A personal computer including a main processor wherein the personal computer further comprises:

software that, when read by the main processor, causes the main processor to extract motion vectors from video data, and decompressing the video data, and a graphics coprocessor that performs motion compensation on the video data based on the motion vectors extracted by the central processor through executing the stored program; and that uses the motion vectors to retrieve motion compensation reference blocks from frames of video data.

14. The personal computer of claim 13 wherein the software further comprises programming instructions that cause the main processor to execute Huffman decoding and RLE decoding, and wherein the video data includes MPEG video data.

15. The personal computer of claim 13 wherein the software further comprises programming instructions that cause the main processor to form the inverse transform of the video data to transform the video data from spatial frequency coefficients to pixels.

16. The personal computer of claim 13 wherein the motion compensated performed by the graphics coprocessor is performed using bit BLT operations.

17. The personal computer of claim 13 wherein the graphics coprocessor further comprises means for interpolating to determine an interpolated reference block, and wherein the interpolating is performed using bit BLT operations.

* * * * *